United States Patent
King et al.

(10) Patent No.: US 11,431,428 B2
(45) Date of Patent: *Aug. 30, 2022

(54) SYSTEM AND METHOD FOR PROCESSING SIGNALS USING FEED FORWARD CARRIER AND TIMING RECOVERY

(71) Applicant: Kratos Integral Holdings, LLC, San Diego, CA (US)

(72) Inventors: Brandon Gregory King, San Diego, CA (US); Jeffrey David Jarriel, SaCAn Diego, CA (US)

(73) Assignee: KRATOS INTEGRAL HOLDINGS, LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/031,507

(22) Filed: Sep. 24, 2020

(65) Prior Publication Data
US 2021/0250113 A1    Aug. 12, 2021

Related U.S. Application Data

(63) Continuation of application No. 16/230,993, filed on Dec. 21, 2018, now Pat. No. 10,790,920.

(51) Int. Cl.
*H04J 3/06*        (2006.01)
*G06F 3/041*        (2006.01)
(Continued)

(52) U.S. Cl.
CPC ............ *H04J 3/0632* (2013.01); *G06F 3/041* (2013.01); *H04B 7/18515* (2013.01); *H04L 27/34* (2013.01); *H04W 56/005* (2013.01)

(58) Field of Classification Search
CPC ... G06F 3/041; H04B 7/1851; H04B 7/18515; H04B 7/18523; H04B 7/18578;
(Continued)

(56) References Cited

U.S. PATENT DOCUMENTS 5,233,626 A     8/1993   Ames
5,585,803 A *   12/1996   Miura ...................... H01Q 3/26
                                                           342/157

(Continued)

FOREIGN PATENT DOCUMENTS

EP            3537679 A1      9/2019
WO    WO-2019243565 A1 *   12/2019         H04B 1/0003

OTHER PUBLICATIONS

Zhou, X., "Efficient Clock and Carrier Recovery Algorithms for Single-Carrier Coherent Optical Systems: A systematic review on challenges and recent progress", Feb. 19, 2014, IEEE, IEEE Signal Processing Magazine ( vol. 31, Issue: 2, Mar. 2014), pp. 35-45, Total pp. 11 (Year: 2014).*

(Continued)

*Primary Examiner* — Shah M Rahman
(74) *Attorney, Agent, or Firm* — Procopio, Cory, Hargreaves & Savitch LLP

(57) ABSTRACT

Systems, methods, and computer-readable media for processing a digital bit stream representative of a communication signal are provided. The method can include dividing, at one or more processors, the digital bit stream into a plurality of data packets, each having an overlap of data from an adjacent packet. The method can include performing a timing recovery operation and a carrier recovery operation on portions of the plurality of data packets in multiple processing blocks in the processor, in parallel. The method can include combining the first plurality and the second plurality based on timing and phase stitching.

24 Claims, 7 Drawing Sheets

(51) Int. Cl.
*H04B 7/185* (2006.01)
*H04L 27/34* (2006.01)
*H04W 56/00* (2009.01)

(58) Field of Classification Search
CPC ...... H04J 3/0632; H04L 27/34; H04L 7/0335; H04L 7/0334; H04W 56/005
See application file for complete search history.

(56) References Cited

U.S. PATENT DOCUMENTS

| | | |
|---|---|---|
| 6,226,323 B1 | 5/2001 | Tan et al. |
| 6,542,480 B1 | 4/2003 | Campanella |
| 6,781,968 B1 | 8/2004 | Colella et al. |
| 6,842,495 B1 | 1/2005 | Jaffe et al. |
| 10,177,952 B1 | 1/2019 | Beeler et al. |
| 10,541,852 B2* | 1/2020 | Stanciu ............... H04L 27/2657 |
| 10,644,916 B1 | 5/2020 | Shattil |
| 10,790,920 B2 | 9/2020 | King et al. |
| 2002/0085648 A1 | 7/2002 | Burns et al. |
| 2003/0219085 A1 | 11/2003 | Endres et al. |
| 2004/0141575 A1* | 7/2004 | Chen .................. H04B 7/18515 375/371 |
| 2004/0190649 A1 | 9/2004 | Endres et al. |
| 2006/0034406 A1 | 2/2006 | Lee |
| 2006/0291599 A1 | 12/2006 | Strodtbeck et al. |
| 2007/0092018 A1 | 4/2007 | Fonseka et al. |
| 2007/0297372 A1 | 12/2007 | Fatemi-Ghomi et al. |
| 2008/0089458 A1* | 4/2008 | Wallace ............... H04L 27/0014 375/371 |
| 2008/0159123 A1 | 7/2008 | Tehrani et al. |
| 2009/0003493 A1 | 1/2009 | Gunturi et al. |
| 2009/0007201 A1* | 1/2009 | Eerenberg ............ H04N 21/242 725/104 |
| 2009/0040103 A1* | 2/2009 | Chansarkar ............ H04B 1/707 342/357.77 |
| 2011/0026579 A1 | 2/2011 | Yang |
| 2011/0129041 A1 | 6/2011 | Ishihara et al. |
| 2012/0096061 A1 | 4/2012 | Hauske |
| 2012/0134511 A1* | 5/2012 | Vilermo ................ G10L 19/008 381/107 |
| 2012/0155528 A1 | 6/2012 | Zhong |
| 2013/0006601 A1 | 1/2013 | Mlinarsky et al. |
| 2013/0177115 A1* | 7/2013 | Yang ....................... H04B 7/01 375/347 |
| 2013/0315346 A1* | 11/2013 | Varma ................ H04L 27/2338 375/316 |
| 2014/0219374 A1 | 8/2014 | Pisek |
| 2014/0273815 A1 | 9/2014 | Jayasimha |
| 2014/0321582 A1 | 10/2014 | Cheng et al. |
| 2015/0146805 A1 | 5/2015 | Terry |
| 2015/0208257 A1 | 7/2015 | Marini et al. |
| 2017/0353228 A1* | 12/2017 | Watson ............... H04W 56/005 |
| 2018/0069631 A1 | 3/2018 | Ashrafi |
| 2018/0248676 A1 | 8/2018 | Raggio et al. |
| 2019/0372819 A1* | 12/2019 | Jong ......................... H04L 1/20 |
| 2020/0204281 A1 | 6/2020 | King et al. |
| 2020/0313730 A1 | 10/2020 | Lea et al. |

OTHER PUBLICATIONS

Barros et al. "A Soft-Handover Scheme for LEO Satellite Networks." IEEE 78th Vehicular Technology Conference, Sep. 2, 2013, pp. 1-5.

International Search Report and Written Opinion for corresponding application No. PCT/US2020/065351, dated Apr. 23, 2021, in 16 pages.

International Search Report and Written Opinion for corresponding application No. PCT/US2020/065358 dated Apr. 21, 2021, in 15 pages.

Callaghan et al. "An investigation of site diversity and comparison with ITU-R recommendations." Radio Science. vol. 43, No. 4. Aug. 1, 2008. 8 pages.

International Search Report and Written Opinion for corresponding application No. PCT/US2019/064183, dated Mar. 12, 2020, in 13 pages.

International Search Report and Written Opinion for corresponding application No. PCT/US2021/033867 dated Feb. 14, 2022, in 11 pages.

International Search Report and Written Opinion for corresponding application No. PCT/US2021/033875 dated Feb. 14, 2022, in 14 pages.

International Search Report and Written Opinion of PCT/US2021/033905 dated Apr. 4, 2022.

* cited by examiner

SYSTEM AND METHOD FOR PROCESSING SIGNALS USING FEED FORWARD CARRIER AND TIMING RECOVERY

CROSS-REFERENCE TO RELATED APPLICATION

This application is a continuation of U.S. Nonprovisional application Ser. No. 16/230,993, filed Dec. 21, 2018 entitled SYSTEM AND METHOD FOR PROCESSING SIGNALS USING FEED FORWARD CARRIER AND TIMING RECOVERY, the contents of which are hereby incorporated by reference in its entirety.

BACKGROUND

Technical Field

This disclosure relates to signal processing. More specifically, this disclosure relates to feed forward carrier and timing recovery for phase shift keying (PSK) waveforms utilizing single instruction-multiple data (SIM D) architectures.

Related Art

In some examples, a satellite communication signal can require large ground stations and other facilities to transmit and/or receive and process data locally. This can include extensive antenna arrays, associated radio frequency terminals (RFTs), and significant electronics (modems, signal processors, etc.) to receive, process, and use the data received from an associated satellite.

SUMMARY

This disclosure addresses systems and methods for satellite communications using downlink site diversity and uplink transmit power management. A plurality of ground stations can include a piggyback signal in transmissions to ensure coherent reception of multiple versions of a signal using site diversity.

An aspect of the disclosure provides a method for processing a digital bit stream representative of a communication signal. The method can include dividing, at one or more processors, the digital bit stream into a plurality of data packets, each of the data packets of the plurality of data packets including an overlap of data from an adjacent packet. The method can include performing a timing recovery operation on a first portion of the plurality of data packets in a first processing block in the processor. The method can include performing a carrier recovery operation on the first portion of the plurality of data packets in the first processing block in the processor. The method can include performing the timing recovery error calculation on a second portion of the plurality of data packets in a second processing block in the processor in parallel with the first plurality of packets. The method can include performing the carrier recovery error calculation on the second portion of the plurality of data packets in the second processing block in the processor in parallel with the first plurality of packets. The method can include combining the first plurality and the second plurality based on timing and phase stitching.

Another aspect of the disclosure provides a non-transitory computer readable medium comprising instructions for processing a digital bit stream representative of a communication signal. The instructions can cause one or more processors to divide the digital bit stream into a plurality of data packets, each of the data packets of the plurality of data packets including an overlap of data from an adjacent packet. The instructions can cause one or more processors to perform a timing recovery operation [FIG. 6] on a first portion of the plurality of data packets at a first processing block. The instructions can cause one or more processors to perform a carrier recovery operation on the first portion of the plurality of data packets at the first processing block. The instructions can cause one or more processors to perform the timing recovery error calculation on a second portion of the plurality of data packets at a second processing block in parallel with the first plurality of packets. The instructions can cause one or more processors to perform the carrier recovery error calculation on the second portion of the plurality of data packets at the second processing block in parallel with the first plurality of packets. The instructions can cause one or more processors to combine the first plurality and the second plurality based on timing and phase stitching.

Another aspect of the disclosure provides a system for processing a digital bit stream representative of a communication signal. The system can have a digitizer operable to convert a received analog signal into the digital bitstream. The system can have one or more processors communicatively coupled to a plurality of processing blocks. The one or more processors can divide the digital bit stream into a plurality of data packets. Each of the data packets of the plurality of data packets can have an overlap of data from an adjacent packet. A first processing block of the plurality of processing blocks can perform a timing recovery operation on a first portion of the plurality of data packets.

The first processing block can perform a carrier recovery operation on the first portion of the plurality of data packets. A second processing block of the plurality of processing blocks can perform the timing recovery error calculation on a second portion of the plurality of data packets in parallel with the first plurality of packets. The second processing block can perform the carrier recovery error calculation on the second portion of the plurality of data packets in parallel with the first plurality of packets. The one or more processors can combine the first plurality and the second plurality based on timing and phase stitching.

Other features and benefits will be apparent to one of skill in the art with a review of the following description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A satellite communication system is used as a primary example throughout the description, however, the application of the disclosed methods is not so limited. For example, any communication system requiring the use of a modem can implement the systems, methods, and computer readable media described herein.

Figure 1:
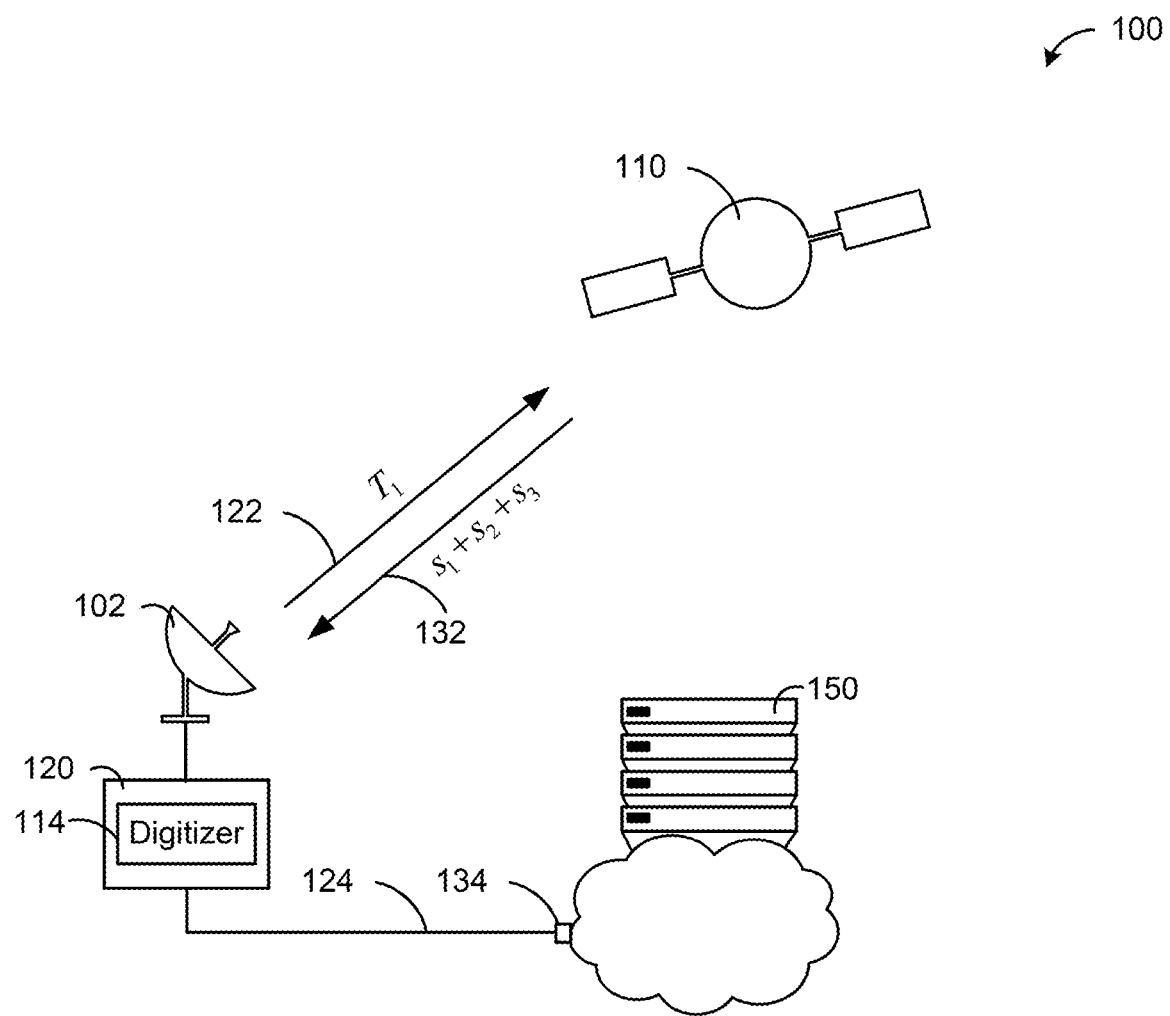
FIG. 1 is a graphical representation of an embodiment of a satellite communication system.

FIG. 1 is a graphical representation of an embodiment of a communication system. A communication system (system) 100 can have a satellite 110 that communicates with a satellite ground station (ground station) 120. The ground station 120 can have an antenna 102 coupled to a digitizer 114. The digitizer 114 can have one or more analog to digital converters (A2D) for converting analog signals received at the antenna 102 into a digital bit stream for transmission via a network. The digitizer 114 can also include corresponding digital to analog converters (D2A) for operations on the uplink to the satellite 110.

The ground station 120 can transmit an uplink signal 122 to the satellite 110 via the antenna 102 in a transmit chain. The ground station 120 can also receive a downlink signal 132 from the satellite 132 via the antenna 102 in a receive chain. The digitizer 114 can digitize the received downlink signal 132 for transmission as the digital bit stream 134. The digital bit stream 134 can then be transmitted, via a network 124 to a cloud processing system.

In some examples, the ground station 120 can process all of the data (e.g., contained in the downlink signal 132) locally, however this can be exceptionally expensive from a time, resource, and efficiency perspective. Therefore, in some embodiments, the downlink signal 132, received from the satellite 110, can be digitized and transmitted as the digital bit stream 134 to a remote signal processing server (SPS) 150. The SPS 150 can be positioned in a physical location, such as a data center located in an offsite facility that is accessible via a wide area network (WAN). Such a WAN can be the Internet, for example. The SPS 150 can demodulate the downlink signal 132 from the digital bit stream 134 and output the data or information bits from the downlink signal 132. Given the remote location of the SPS 150 and the connection with the network 124, the described signal processing performed by the SPS 150 can be referred to as cloud processing. The SPS 150 can also be referred to as a cloud server.

The SPS 150 can then provide the processed data to the user to be processed within the SPS 150 or sent remotely to a different site. The data and information can be mission-dependent. In addition, the information contained in the data can be the main purpose of the satellite, including weather data, image data, and satellite communication (SATCOM) payload data.

In order to achieve high processing rates with software, a phase lock loop (PLL) approach can be problematic due to the feedback within the loop. The feedback loop forces all of the incoming data (e.g., the downlink signal 132) to be processed on a single (e.g., linear) process that cannot not be easily spilt or otherwise divided. In addition to the feedback, there are other obstacles to overcome using the PLL including, for example, how often to calculate the error term.

Figure 2:
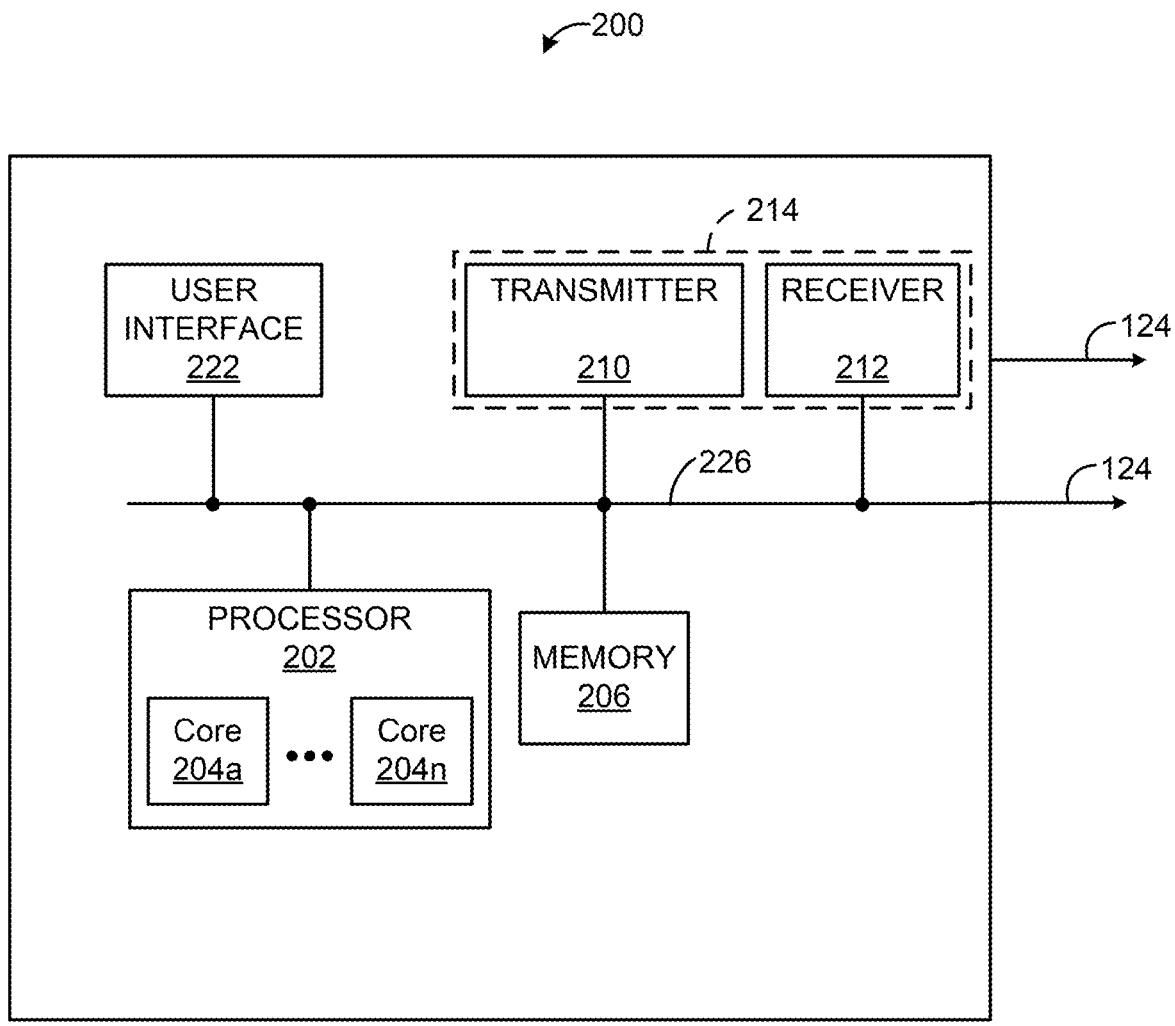
FIG. 2 is a functional block diagram of a communication device for use with the system of FIG. 1.

FIG. 2 is a functional block diagram of a communication device for use with the system of FIG. 1. A processing device (device) 200 may be implemented as, for example, the SPS 150 of FIG. 1. The device 200 can be implemented as needed to perform one or more of the signal processing methods or steps disclosed herein.

The device 200 may include a processor 202 which controls operation of the device 200. The processor 202 may also be referred to as a central processing unit (CPU). The processor 202 can direct and/or perform the functions, for example, attributed to SPS 150. The processor 202 may be implemented with any combination of one or more of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 202 have contain one or more cores 204 (shown as core 204a through core 204n) on which the computations can be performed. The processor 202 can be a complex, integrated circuit on which all the computations for the receiver are taking place. As used herein, the cores 204 can each be one processing element of the processor 202. The processor 202 can implement multiple cores 204 to perform the necessary parallel processing for the methods disclosed herein. In some embodiments, the processor 202 may be distributed across multiple CPUs as in cloud computing.

The device 200 may further include a memory 206 operably coupled to the processor 202, which may include both read-only memory (ROM) and random access memory (RAM), providing instructions and data to the processor 202. A portion of the memory 206 may also include non-volatile random access memory (NVRAM). The processor 202 typically performs logical and arithmetic operations based on program instructions stored within the memory 206. The instructions in the memory 206 may be executable to implement the methods described herein. The memory 206 can further include removable media or multiple distributed databases.

The memory 206 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 202 or the one or more cores 204, cause the device 200 (e.g., the SPS 150) to perform the various functions described herein.

The device 200 may also include a transmitter 210 and a receiver 212 to allow transmission and reception of data between the communication device 200 and a remote location. Such communication can occur between the ground station 120 and the SPS 150 via the network 124, for example. Such communications can be wireless or conducted via wireline communications. The transmitter 210 and receiver 212 may be combined into a transceiver 214. The transceiver 214 can be communicatively coupled to the network 124. In some examples the transceiver 214 can include or be a portion of a network interface card (Nip.

The device 200 may further comprise a user interface 222. The user interface 222 may comprise a keypad, a microphone, a speaker, and/or a display. The user interface 222 may include any element or component that conveys information to a user of the device 200 and/or receives input from the user.

The various components of the device 200 described herein may be coupled together by a bus system 226. The bus system 226 may include a data bus, for example, as well as a power bus, a control signal bus, and a status signal bus in addition to the data bus. In some embodiments, the bus system 226 can be communicatively coupled to the network 124. The network 124 can provide a communication link between the device 200 (e.g., the processor 202) and the ground station 120, for example. Those of skill in the art will appreciate the components of the device 200 may be coupled together or accept or provide inputs to each other using some other mechanism such as a local- or wide area network for distributed processing.

Figure 3:
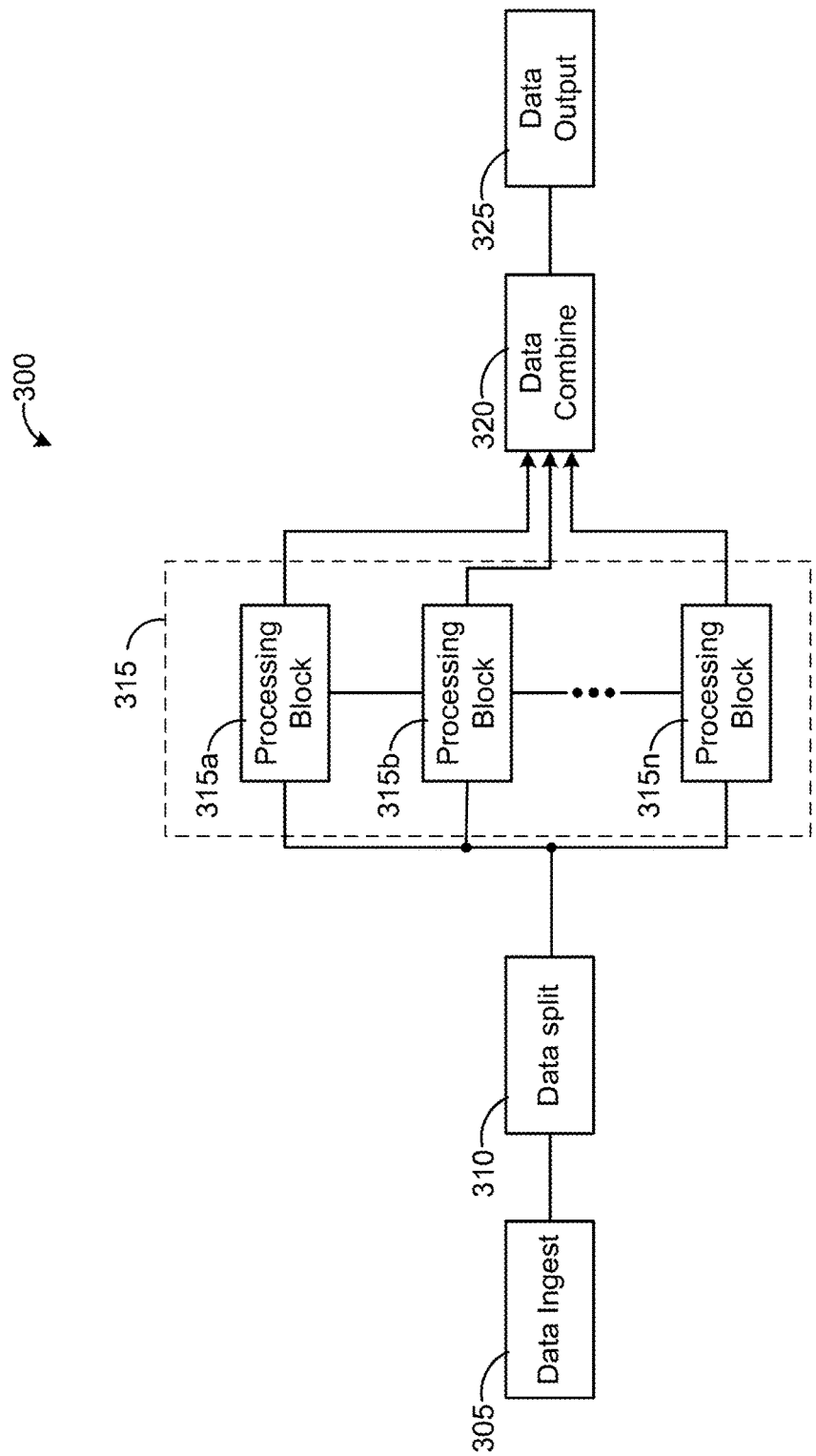
FIG. 3 is a graphical depiction of an embodiment of a method for feedforward signal processing of FIG. 1.

FIG. 3 is a graphical depiction of an embodiment of a method for feedforward signal processing of FIG. 1. A method 300 can occur as the SPS 150 receives digitized versions or digital samples of the downlink signal 132 (the digital bit stream 134). Using the method 300, the SPS 150 can output information contained in the signal 132 as bits (samples in, bits out). Thus, an exemplary benefit of the method 300 is efficient software processing of high-rate data streams.

At block 305, the SPS 150 can ingest or otherwise receive the digital bit stream 134 (e.g., via the network 124). The data ingest at block 305 can receive the digital bit stream 134 data from a network connection (e.g., Ethernet).

At block 310, the data can be split into parallel data streams by a data splitter. In some embodiments, the processor 202 can perform data splitting functions required in block 310. In some other embodiments, a separate data splitting component (e.g., a data splitter) can be included in the device 200 (FIG. 2). Splitting the data into multiple parallel streams can allow parallel processing of the downlink signal 132. The method 300 can therefore take advantage of feedforward processing to allow the incoming digitized signal data to be broken into smaller pieces and then processed on multiple cores 204. The digital bit stream 134 can be split to form overlapping packets in in-phase/quadrature (I/Q) pairs. In some embodiments, the "overlapping packets" can include data packets in which successive packets are overlapped with adjacent data packets. In some embodiments the data packets may all be the same length, but overlapped. The overlap in data packets can be at the beginning of the data packet or at the end. In addition, a data packet can overlap with both the preceding and the following data packets. The data packets can also have different lengths (e.g., varying amounts of data). Therefore a first packet sent to the processing block 315*a* may overlap or otherwise repeat certain data of a second packet sent to the processing block 315*b*.

The amount of overlap between packets, or overlap size can be programmable and set as needed. In some examples, the overlap can be set to one percent (1%) of the packet size. This overlap size can be increased or decreased depending on need. For example, one particular parameter that can impact the overlap size is the uncertainty of the symbol rate in the data stream 134. For most signals, the worst case uncertainty is less than 1%, so a 1% covers most cases. In some other embodiments, the overlap can be 2%, 3%, 4%, 5%, 6%, 7%, 8%, 9%, or as high as 10%, or anywhere in between, as needed. It is also possible to have less than 1% overlap as well. The overlap could be 0.1% or lower if the data rate uncertainty is less than 0.1%.

The processor 202 can implement single instruction, multiple data (SIMD) processing on the digital bit stream 134. In some examples, SIMD can include Advanced Vector Extensions using 512 bits (AVX-512) allowing 16 floating point operations on a single CPU core on a single CPU instruction. AVX-512, for example, can process enormous amounts of data with the CPU (e.g., the CPU 202). For example, the processor 202 (and the device 200) can receive a 500 MHZ bandwidth data stream. 500 MHz of bandwidth is significant in some respects because that is a generally accepted practical limit of a 10 Gigabit Ethernet link. Sampling the data at 500 MHz, with 8 bits samples for an I/Q pair and including parity bits, can saturate a 10 Gbit Ethernet link. The 500 MHz example is not limiting on the disclosure. Data pipes larger than a 10 Gbit Ethernet link are possible. In addition, the processing can be split into n-number of parallel blocks (e.g., block 315) to accommodate any amount of data.

Block 315 is shown in dashed lines and depicts a processing step of the method 300. Block 315 is shown in multiple, parallel steps, or block 315*a*, 315*b* through 315*n*. The term "parallel" is used herein to describe that processing occurs in the processing blocks 315*a*-315*n* at the same time. The packets being processed may be of different lengths from one processing block 315 to another, so the processing of packets may have the same rate or speed from one processing block 315 to the next. As noted below, some of the processing bocks 315 may proceed faster or slower than others. Accordingly, the term parallel should not be limited to simultaneous or concurrent processing within the processing blocks 315.

The processing blocks 315 as used herein, can refer to a collection of processing functions performed by the processor 202, for example. The digital bit stream 134 can be sent into multiple parallel processing blocks 315*a*, 315*b* . . . 315*n* to spread the processing load across several cores 204. Thus, the processing of each of the processing blocks 315*a*-315*n* can be associated with a core 204*a*-204*n*. The number of processing blocks 315 needed varies based on the amount of data being processed. In some embodiments, the number of processing blocks 315 can be limited by the number of logical cores within the processor 202. In some other embodiments, memory bandwidth constraints can cause a bottle neck in the signal processing. Memory bandwidth can refer to the rate at which data can be read from or stored into a semiconductor memory (e.g., the memory 206) by a processor (e.g., the processor 202).

In some embodiments, the number of processing blocks 315 can vary. In general, the fewer processing blocks 315 present, the better to limit the number of cores needed for the entire process. This can further enable the system to fit into smaller virtual private cloud (VPC) machines which are cheaper to operate. A VPC can include the SPS 150 having several CPUs, for example. In some embodiments, 8 processing blocks 315 can be used for a 10 Gbit Ethernet link. Such an embodiment may not include forward error correction processing blocks. In some other embodiments, the only practical limitation on the number of processing blocks 315 needed is the bitrate and bandwidth of the communication link (e.g., size of the pipe). Accordingly, any number (n) of processing blocks 315 is possible. In some embodiments, however a practical limitation on the number (n) processing blocks 315 may be present based on the number of threads that can be run on a CPU or the number of cores 204 in the processor 202. However, if the limits are reached within a single CPU, multiple CPUs (e.g., the processor 202) together within the SPS 150 (e.g., a VPC) and have, an unlimited number of CPUs or cores 204 to perform the processing. In addition, the processor 202 can create new processing block 315 as needed. The processing cores 204 can be spread across multiple distributed processors (e.g., the processor 202) as needed for throughput and efficiency.

The processing blocks 315 are arranged in such a way that it does not matter which processing block 315a, 315b . . . 315n are performed the slowest (or fastest). The method 300 can share the processing load across the processing blocks 315 and therefore alleviate any processing delays caused by bottle necking issues at individual processing blocks 315. For example, individual subprocesses of the processing blocks 315 (see description of FIG. 4, below) may not be performed or occur at equal rates (e.g., some are faster than others). Accordingly, larger process of the method 400 (FIG. 4), for example, can account for variations in performance or processing times. The processing blocks 315 can then be created as many times as needed to handle the incoming data.

In some embodiments, each processing block 315 can represent a collection of signal processing algorithms performed by the processor 202. As used herein, an algorithm can refer to the smallest collection of functions or method steps that perform a desired function. Multiple exemplary algorithms are described herein.

An exemplary benefit of the method 300 is the ability to create more processing blocks 315 when needed. In general, the processing blocks 315 can be implemented in software, and so can be created or eliminated as needed to suit a given data rate or processing load. Each processing block 315 can be rearranged to fit the needs of different received waveforms (e.g., the downlink signal 132) and the associated digital bit streams 134. Two possible arrangements of processing blocks are described below in connection with FIG. 4 and FIG. 5.

At block 320 the processed signal data from the multiple processing blocks 315 can be recombined to form the original data encoded and modulated on the downlink signal 134. In some embodiments, the processor 202 can perform the functions of a data recombiner. In other embodiments, the device 200 can have an additional component to perform such functions. Each data packet or processed block of data can have a time stamp. The data recombiner (e.g., the processor 202) can order the data blocks based on the time stamps and compare the phase between the ordered blocks. The recombiner can further adjust the phase of adjacent blocks reorder the data stream. In some embodiments, the phase of a subsequent data block can be adjusted to match the phase of a previous data block.

At block 325, the device 200 can output the data to an appropriate receiver. In some examples such a receiver can be one or more mission operations centers. This data can be mission dependent (e.g., the purpose of the satellite), and can include, among other things, weather data, image data, and SATCOM payload data.

Figure 4:
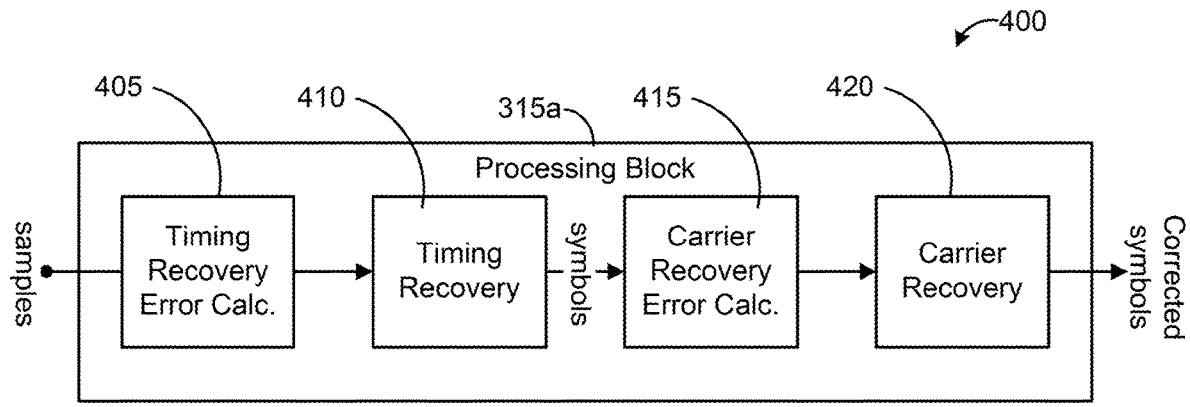
FIG. 4 is a flowchart of a method for signal processing of FIG. 3.

FIG. 4 is a flowchart of an example of a method for signal processing of FIG. 3. A method 400 is shown and can be implemented as the processes that occur in each of blocks 315a-315n of FIG. 3. The method 400 can be used for standard waveform processing as opposed to offset waveforms described below. For example, standard waveform processing can be used for waveforms that map bits into symbols and then modulate the symbols onto a carrier wave. Examples of standard waveforms include binary phase shift keying (BPSK), quadrature phase shift keying (QPSK), 8PSK, 16APSK, 32APSK and 64 APSK as well as quadrature amplitude modulation (QAM) waveforms.

At block 405 the processor 202 (e.g., one or more of the cores 204) can perform a timing recovery error calculation on the received data packets (e.g., samples of the digitized bitstream 134 or the digitized downlink signal 132). The timing recovery error calculation can provide the needed phase information to properly align a matched filter to the incoming data stream (e.g., the digitized bit stream 134). The match filter is used to match the transmitted waveform in the time domain and is aligned by the timing error to capture all the energy in the received signal to optimize performance. An example of the process of block 405 is described in connection with FIG. 6. The results of the timing recovery error calculation can include three parameters: 1) starting phase in degrees; 2) frequency adjustment in Hertz (Hz); and 3) Doppler rate adjustment in Hz/sec. The foregoing units are exemplary and are not limiting on the disclosure. Other equivalent units are also possible.

At block 410 the processor 202 (e.g., one of the cores 204) can perform a timing recovery on the packets to align an internally generated match filter to the received samples that were generated with the modulator's respective match filter. The alignment is based on the calculation in block 405. The output of block 410 is the synchronized (e.g., time-corrected) symbols within the data packets received at block 405.

At block 415 the processor 202 (e.g., one of the cores 204) can perform a carrier recovery error calculation on the packets to determine phase and frequency information. A more detailed explanation of an example of the functions performed in block 415 is described below in connection with FIG. 7.

At block 420 the processor 202 (e.g., one of the cores 204) can perform a carrier recovery on the packets based on the calculation in block 415. Carrier recovery compensates for unknown frequency, Doppler rate, and phase offsets in the downlink signal 132 from the spacecraft (e.g., the satellite 110). The two most common sources of uncertainty are the Doppler effects from the spacecraft motion and from imperfect oscillators within the spacecraft. The processor 202 can apply the phase, frequency, and Doppler rate corrections from block 415 to form a synchronous symbols corresponding to the modulated data in the downlink signal 132 at the output of block 420.

Figure 5:
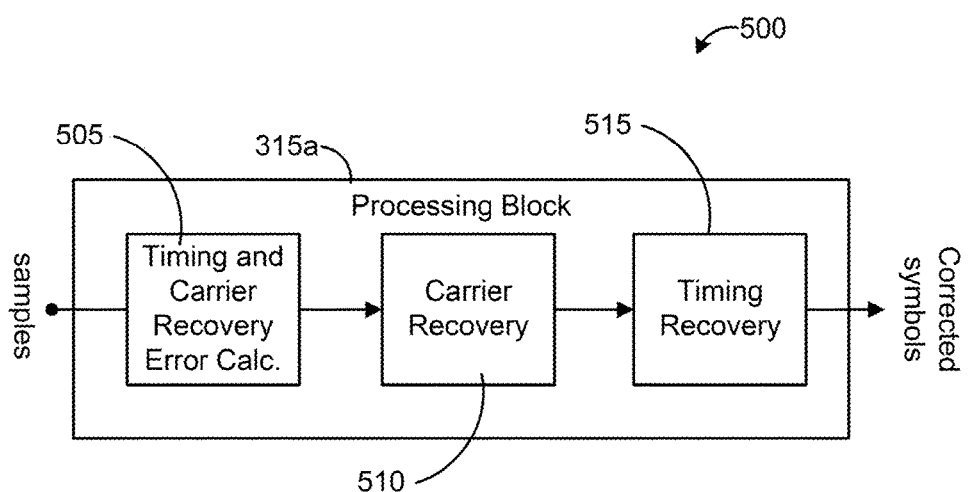
FIG. 5 is a flowchart of a method for signal processing of FIG. 3.

FIG. 5 is a flowchart of an embodiment of a method for signal processing of FIG. 3 (the processes that occur in each of blocks 315a-315n). A method 500 can be similar to the method 400 (FIG. 4), combining and rearranging some of the steps. The method 500 can be used for offset waveform processing. For example, offset waveform processing can be used for waveforms having an offset or stagger between the In-phase (I) and Quadrature (Q) channels, such as waveforms like Offset quadrature phase-shift keying (OQPSK), minimum-shift keying (MSK), Gaussian minimum-shift keying (GMSK), and shaped-offset quadrature phase shift (SOQPSK).

At block 505, the processor 202 can perform a timing and carrier recovery error calculation on the packets. The timing recovery error calculation and the carrier recovery error calculation are similar to those performed in block 420 (FIG. 4). In the method 500 though, the carrier recovery is performed before timing recovery of the symbols. The input to the method 400 is the data samples and the output is corrected, synchronous symbols.

At block 510, the processor 202 can perform a carrier recovery operation based on the calculation from block 505. The substeps of block 505 are described below in connection with FIG. 8.

At block 515, the processor 202 can perform a timing recovery operation based on the calculation from block 505.

Figure 6:
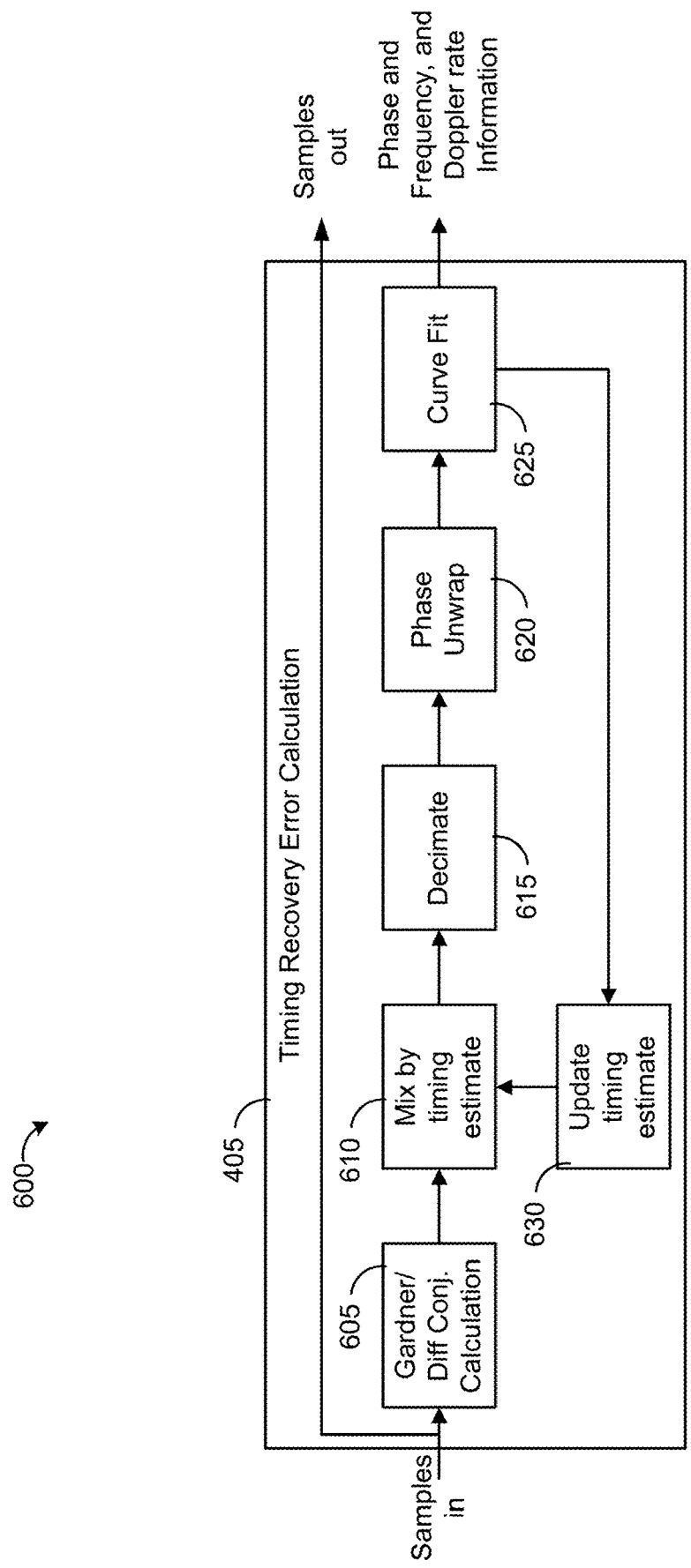
FIG. 6 is a flowchart of a method for timing recovery error calculation.

FIG. 6 is a flowchart of an example method for timing recovery error calculation for block 405 in FIG. 4.

At block 605, the processor 202 can apply a Gardner Timing Error Detector to the incoming data to create the timing information, as is known in the art. In another embodiment, the incoming sample stream can be delayed by one sample. Then the non-delayed data can be multiplied by the conjugate (conjugate multiplication) of the delayed data. Both have advantages and drawbacks so it is an engineering tradeoff on which may be implemented.

Both the Gardner Timing Error Detector and conjugate multiplication can result in a timing spike in the frequency domain. The "timing spike" appears as a single frequency tone in the frequency domain. The timing spike contains the timing estimation information, including starting phase in cycles, degrees, or radians, timing frequency offset in Hz and timing Doppler estimation in Hz/sec. The timing spike can be mixed to DC by the estimated symbol rate and then filtered and decimated to improve signal-to-noise ratio to improve the accuracy of the phase, frequency and Doppler Rate estimate. The carrier frequency and symbol rate estimate is initially derived from an acquisition function. The carrier frequency and symbol rate estimation is calculated similarly to the feed forward error recovery algorithms. There are two main differences: 1) the decimation is much less to enable a wider frequency range to be detected and 2) the phase unwrap and curve fit calculation is replaced with an FFT followed by a peak search calculation. Once the initial estimate is derived, the estimate is later updated (e.g., within the block 630).

Both methods have the benefit of being fairly insensitive to carrier uncertainty and therefore can be run before carrier recovery. Another benefit to running the timing recovery step first is this drops the sample rate down from about two times (2×) the symbol rate to exactly 1× the symbol rate and therefore the carrier recovery algorithm runs at the lowest rate possible. Another benefit is the carrier recovery loop can then operate with an improved signal-to-noise ratio since the sample rate is now half the original sample rate.

At block 610 the processor 202 can mix the timing spike generated at block 605 with a timing estimate or an estimate of the symbol rate. As the method 300 is initiated, certain information about the downlink signal 132 may not be known. Accordingly, at block 610 the processor 202 may use an initial estimate of the symbol rate to mix with the timing spike from block 605. This estimate is later updated, as described below. This process can mix the time spike to DC so it can be easily filtered by a decimation filter. The block 605 and the block 610 can provide a timing error of the data packets/data samples.

At block 615 the processor 202 can decimate the mixed signal to reduce the sampling rate. Decimation can improve the signal-to-noise ratio since the power in the timing spike (the signal) is passed entirely through the filter but the noise power is reduced proportional to the decimation rate.

At block 620 the processor 202 can perform a phase unwrap calculation on the decimated samples. This can include a phase calculation of the decimated signal that is performed before the phase unwrap. The phase unwrap calculation can provide continuous phase information about the data samples. The phase unwrap calculation stitches the phase together when the phase wraps either from $\pi$ (pi) to $-\pi$ or $-\pi$ to $\pi$ radians. This unwrapping on the angle allows for a curve fitting function to run on a phase signal without any discontinuities. This can allow the processor 202 to reassemble the demodulated signal based on timing and phase of the processed packets.

At block 625 the processor 202 can perform a curve fit calculation to determine phase, frequency, and Doppler rate offset information that can be applied to update the timing estimate at block 630. In general, the curve fit can result in a quadratic representation of the phase, frequency, and Doppler rate information of the data samples, and ultimately the downlink signal 132. For example, for the quadratic equation, $Ax^2+Bx+C$, A represents Doppler Rate, B, frequency, and C, phase. The output of the method 600 is the originally received samples and associated metadata (e.g., the phase, frequency, and Doppler rate information).

It is possible to replace the phase unwrap and curve fit calculation with a Kalman filter to obtain the phase, frequency and Doppler Rate information.

Figure 7:
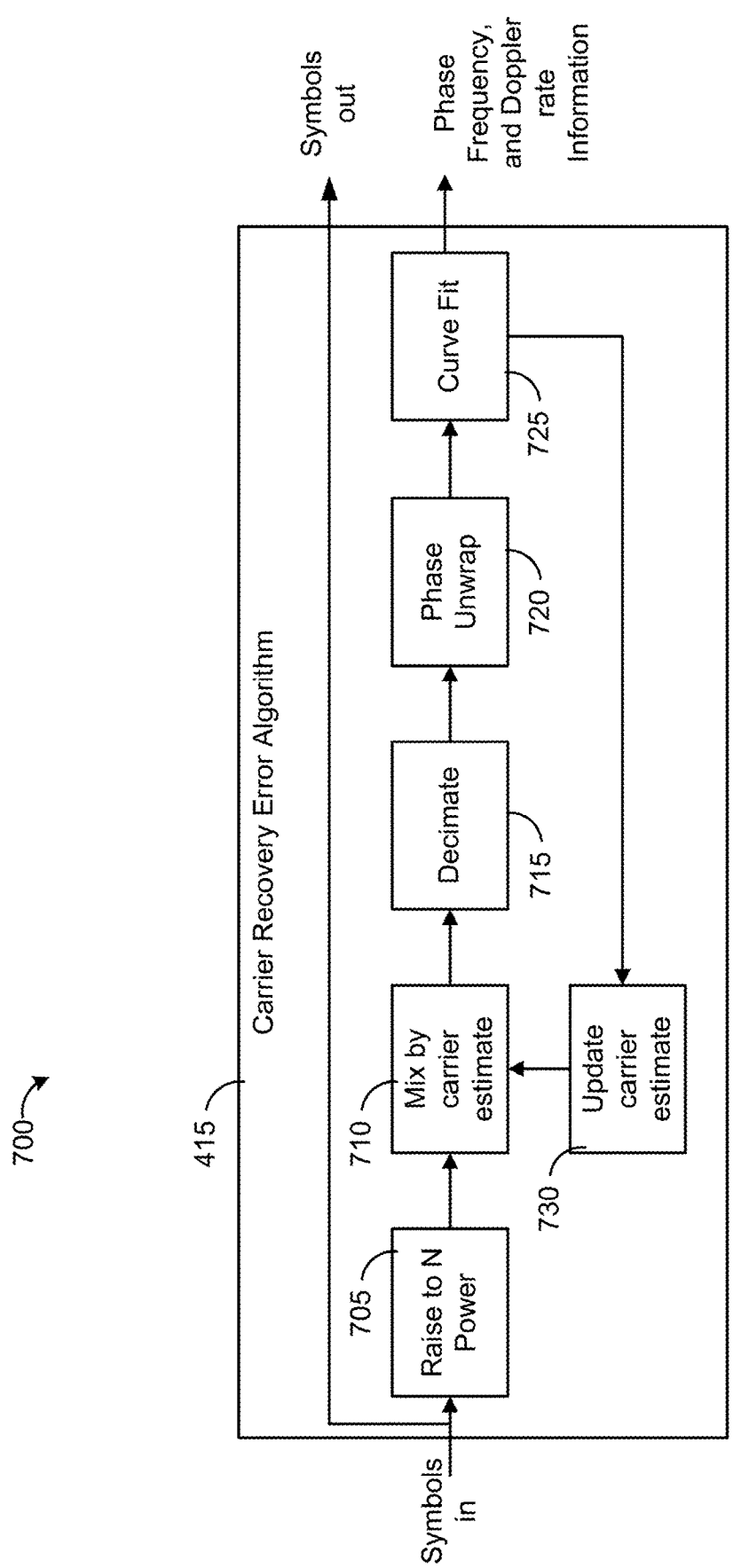
FIG. 7 is a flowchart of a method for determining carrier recovery error.

FIG. 7 is a flowchart of an example of a method for determining carrier recovery error for block 415 of FIG. 4. A method 700 can be used to calculate the needed phase, frequency, and Doppler rate information to create a mixing signal to properly demodulate the incoming symbol synchronized signal.

At block 705, the incoming signal can be raised to certain power based on modulation type (e.g., BPSK raises to the power of 2; QPSK raises to the power of 4; 8PSK raises to the power of 8). Raising the signal to a power may be multiplying the signal by itself n-number of times, where n is an integer. This may also be referred to herein as exponentiating the signal. The result of such calculation is a carrier spike in the frequency domain (e.g., a continuous wave signal) that can be mixed to DC with a carrier estimate at block 710. The estimate can be generated using the acquisition function described above in connection with FIG. 6.

At block 715 the processor 202 can decimate the mixed signal to reduce the sampling rate, similar to block 615 (FIG. 6) above. Decimation can improve the signal-to-noise ratio since the power in the timing spike (the signal) is passed entirely through the filter but the noise power is reduced proportional to the decimation rate.

At block 720 the processor 202 can perform a phase unwrap calculation on the decimated samples similar to block 620 (FIG. 6) above.

At block 725 the processor 202 can perform a curve fit calculation to determine phase, frequency, and Doppler rate offset information that can be applied to update the carrier recovery algorithm (block 415 of FIG. 4).

At block 730, the curve fit can be used to update (and improve) the carrier frequency estimate of block 710. It is possible to replace the phase unwrap and curve fit calculation with a Kalman filter to obtain the phase, frequency and Doppler Rate information.

Figure 8:
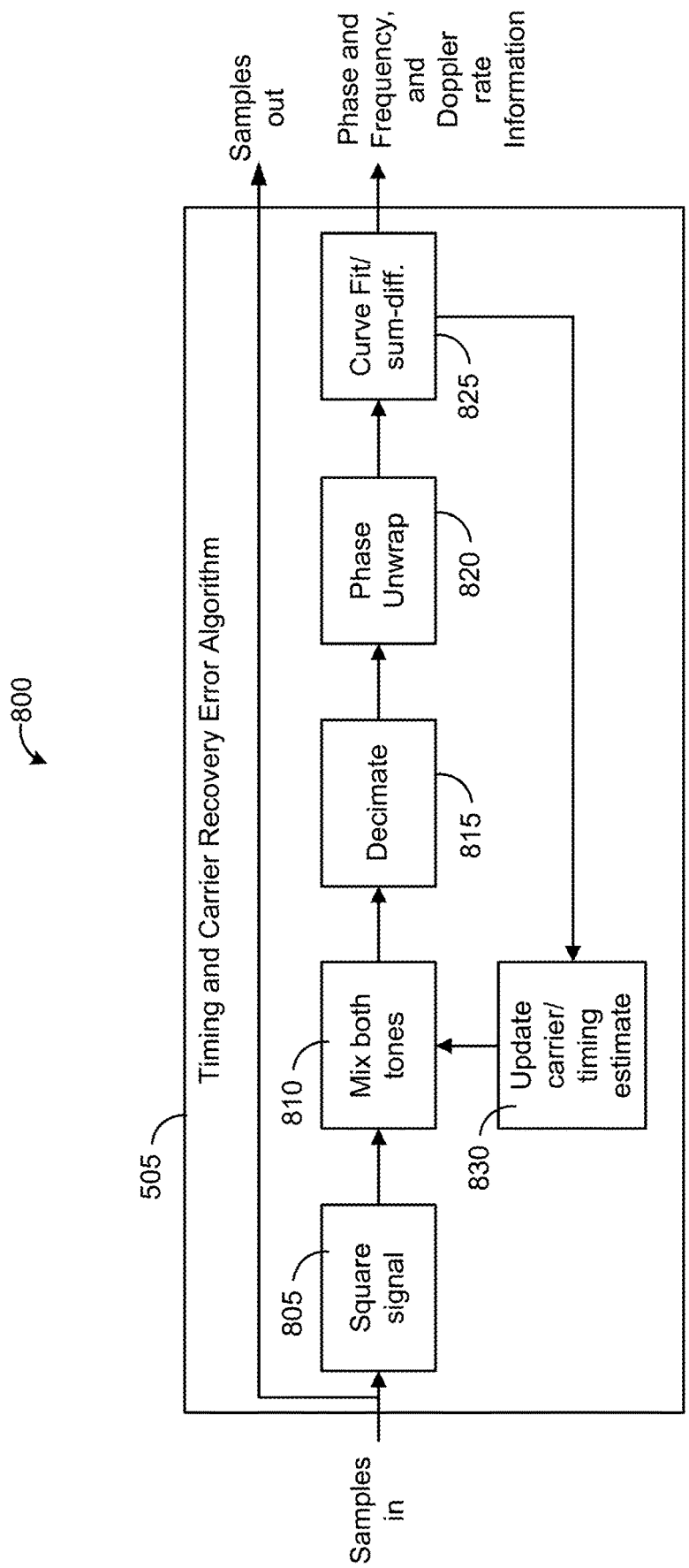
FIG. 8 is a flowchart of a method for a timing and carrier recovery error calculation.

FIG. 8 is a flowchart of a method for the timing and carrier recovery error calculation for block 505 of FIG. 5. A method 800 can be performed at block 505 of FIG. 5. For waveforms with a half-symbol stagger between the I and Q legs, timing and carrier recovery are performed together. Some such waveforms can include OQPSK, MSK, and GMSK, for example. The digitized bit stream 134 can be squared (power of 2) at block 805. This can result in two spikes being created in the frequency domain. Each spike can then be mixed near 0 Hz by the mix signal that is created from a composite estimate of the carrier frequency and symbol rate.

The estimate can be generated using the acquisition function described above in connection with FIG. 6.

At block 815, both mixed signals are then decimated to reduce the sampling rate.

At block 820, the processor 202 can perform a phase unwrap calculation on both mixed signals similar to 620 and 720.

At block 825 the processor 202 can perform a curve-fit calculation similar to 625 and 725 except in block 825 there are two curve fit calculations that occur.

The sum of the two curve fit calculations is the carrier phase and frequency estimate and the difference is the timing phase and frequency estimate. Similar to block 625 (FIG. 6) and block 725 (FIG. 7), the curve fit can result in a quadratic representation of the phase, frequency, and Doppler rate information of the data samples, and ultimately the downlink signal 132. For example, for the quadratic equation, $Ax^2+Bx+C$, A represents Doppler Rate, B-frequency, and C-phase. The output of the method 800 is the originally received samples and associated metadata (e.g., the phase, frequency, and Doppler rate information). However, unlike block 625 and block 725, the system can output data for both the carrier and timing estimates so there is an $Ax^2+Bx+C$ for the carrier and $Ax^2+Bx+C$ for timing at block 825.

At block 830, this information is updated (similar to block 630 and block 730) and passed onto the carrier recovery and timing recovery algorithms in the order as shown in FIG. 8.

The accompanying claims and their equivalents are intended to cover such forms or modifications as would fall within the scope of the disclosure. The various components illustrated in the figures may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects.

Thus, the claims are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

What is claimed is:

1. A method for processing a digital bit stream, wherein the digital bit stream is a digitized communication signal, the method comprising:
dividing, at one or more processors, the digital bit stream into a plurality of data packets, each of the data packets of the plurality of data packets including an overlap of data from an adjacent packet and a timing indication;
in a first processing block in the one or more processors, performing a timing recovery operation on a first portion of the plurality of data packets, and
performing a carrier recovery operation on the first portion of the plurality of data packets;
in a second processing block in the one or more processors, in parallel with the processing of the first portion of the plurality of packets,
performing the timing recovery error calculation on a second portion of the plurality of data packets; and
performing the carrier recovery error calculation on the second portion of the plurality of data packets; and
combining the first portion of the plurality of data packets and the second portion of the plurality of data packets based on the timing indications.

2. The method of claim 1, further comprising
in a third processing block in the one or more processors in parallel with the processing of the first and second portions of the plurality of packets,
performing the timing recovery operation on a third portion of the plurality of data packets, and
performing the carrier recovery operation on the third portion of the plurality of data packets;
in a fourth processing block in the one or more processor in parallel with the processing of the first, second and third portions of the plurality of packets,
performing the timing recovery error calculation on a fourth portion of the plurality of data packets; and
performing the carrier recovery error calculation on the fourth portion of the plurality of data packets; and
wherein the combining further includes combining the first, second, third and fourth portions of the plurality of data packets based on timing and phase stitching.

3. The method of claim 2, wherein the timing indication is a time stamp and the combining further comprises ordering the data packets according to the time stamps.

4. The method of claim 1, wherein the timing recovery operation comprises determining phase offset information associated with in-phase and quadrature (I/Q) data of the first portion and the second portion.

5. The method of claim 3, wherein the combining further includes adjusting the phase of adjacent data packets.

6. The method of claim 1, wherein the timing recovery operation comprises:
receiving overlapping packets as samples of the downlink signal, the samples having an unknown symbol rate and frequency;
determining a timing error of the samples based on an estimate of the symbol rate;
decimating the samples by a decimation filter; and
determining a phase, frequency, and Doppler rate of the samples;
synchronizing the samples as symbols, based on the phase, frequency, and Doppler rate; and
updating the estimate of the symbol rate.

7. The method of claim 6, wherein the carrier recovery operation comprises:
receiving the symbols associated with the synchronized samples of the downlink signal;
determining a carrier error of the symbols based on an estimate of a frequency of the downlink signal and a product of the symbols raised to a power of n, wherein n is an integer;
decimating the symbols by a decimation filter; and
determining a phase, frequency, and Doppler rate of the symbols; and
updating the estimate of the frequency.

8. The method of claim 1, wherein the carrier recovery is performed before timing recovery operation as a timing and carrier recovery error algorithm.

9. The method of claim 8, further comprising:
receiving overlapping packets as samples of the downlink signal, the samples having an unknown symbol rate and frequency;
determining a timing error of the samples based on an estimate of the symbol rate, an estimate of the frequency, and a square of the samples;
decimating the samples by a decimation filter; and
determining a phase, frequency, and Doppler rate of the samples;
synchronizing the samples in time and frequency, based on the phase, frequency, and Doppler rate; and
updating the estimate of the symbol rate.

10. A non-transitory computer-readable medium for processing a digital bit stream of a satellite downlink signal comprising instructions that when executed by one or more processors, cause the one or more processors to:
divide the digital bit stream into a plurality of data packets for parallel processing, each of the data packets of the plurality of data packets including an overlap of data from an adjacent packet;
at a first processing block of the one or more processors, perform a timing recovery operation on a first portion of the plurality of data packets, and
perform a carrier recovery operation on the first portion of the plurality of data packets;
at a second processing block of the one or more processors and in parallel with the first portion of the plurality of packets,
perform the timing recovery error calculation on a second portion of the plurality of data packets; and
perform the carrier recovery error calculation on the second portion of the plurality of data packets; and
combine each of the data packets of the first portion of the plurality of data packets and each of the data packets of the second portion of the plurality of data packets based on timing and phase stitching of adjacent packets.

11. The non-transitory computer-readable medium of claim 10, wherein the timing indication is a time stamp and the combining further comprises ordering the data packets according to the time stamps.

12. The non-transitory computer-readable medium of claim 10, wherein the combining further includes adjusting the phase of adjacent data packets.

13. The non-transitory computer-readable medium of claim 10, wherein the timing recovery operation comprises instructions that further cause the one or more processors to determine phase offset information associated with in-phase and quadrature (I/Q) data of the first portion and the second portion.

14. The non-transitory computer-readable medium of claim 10, wherein the timing recovery operation comprises instructions that further cause the one or more processors to:
receive overlapping packets as samples of the downlink signal, the samples having an unknown symbol rate and frequency;
determine a timing error of the samples based on an estimate of the symbol rate;
decimate the samples by a decimation filter; and
determine a phase, frequency, and Doppler rate of the samples;
synchronize the samples as symbols, based on the phase, frequency, and Doppler rate; and
update the estimate of the symbol rate.

15. The non-transitory computer-readable medium of claim 13, wherein the carrier recovery operation comprises instructions that further cause the one or more processors to:
receive the symbols associated with the synchronized samples of the downlink signal;
determine a carrier error of the symbols based on an estimate of a frequency of the downlink signal and a product of the symbols raised to a power of n, wherein n is an integer;
decimating the symbols by a decimation filter; and
determining a phase, frequency, and Doppler rate of the symbols; and
updating the estimate of the frequency.

16. The non-transitory computer-readable medium of claim 10, wherein the carrier recovery is performed before timing recovery operation as a timing and carrier recovery error algorithm.

17. The non-transitory computer-readable medium of claim 15 further comprising instructions that further cause the one or more processors to:
receive overlapping packets as samples of the downlink signal, the samples having an unknown symbol rate and frequency;
determine a timing error of the samples based on an estimate of the symbol rate, an estimate of the frequency, and a square of the samples;
decimate the samples by a decimation filter; and
determine a phase, frequency, and Doppler rate of the samples;
synchronize the samples in time and frequency, based on the phase, frequency, and Doppler rate; and
update the estimate of the symbol rate.

18. A system for processing a digital bit stream representative of a communication signal, the system comprising:
a digitizer configured to convert a received analog signal into the digital bitstream; and
one or more processors having a plurality of processing blocks and configured to
divide the digital bit stream into a plurality of data packets for parallel processing, each of the data packets of the plurality of data packets including an overlap of data from an adjacent packet and a timing indication,
in a first processing block of the plurality of processing blocks,
perform a timing recovery operation on a first portion of the plurality of data packets,
perform a carrier recovery operation on the first portion of the plurality of data packets, and
wherein synchronous corrected symbols are obtained for each packet in the first portion of the plurality of data packets;
in a second processing block of the plurality of processing blocks and in parallel with the first portion of the plurality of packets,
perform the timing recovery error calculation on a second portion of the plurality of data packets,
perform the carrier recovery error calculation on the second portion of the plurality of data packets, and
wherein synchronous corrected symbols are obtained for each packet in the second portion of the plurality of data packets; and
recombine the synchronous corrected symbols from each packet of the first portion of the plurality of data packets and the synchronous corrected symbols from each packet of the second portion of the plurality of data packets including ordering the packets based on the timing indication and phase stitching.

19. The system of claim 18, wherein the timing recovery operation comprises determining phase offset information associated with in-phase and quadrature (I/Q) data of the first portion and the second portion.

20. The system of claim 18, wherein the timing recovery operation comprises:
receiving overlapping packets as samples of the downlink signal, the samples having an unknown symbol rate and frequency;
determining a timing error of the samples based on an estimate of the symbol rate;
decimating the samples by a decimation filter; and
determining a phase, frequency, and Doppler rate of the samples;
synchronizing the samples as symbols, based on the phase, frequency, and Doppler rate; and
updating the estimate of the symbol rate.

21. The system of claim 19, wherein the carrier recovery operation comprises:
receiving the symbols associated with the synchronized samples of the downlink signal;
determining a carrier error of the symbols based on an estimate of a frequency of the downlink signal and a product of the symbols raised to a power of n, wherein n is an integer;
decimating the symbols by a decimation filter; and
determining a phase, frequency, and Doppler rate of the symbols; and
updating the estimate of the frequency.

22. The method of claim 1, wherein the first processing block and the second processing block are implemented by one or more central processing units having multiple cores and implementing single instruction, multiple data (SIMD) processing.

23. The non-transitory computer-readable medium of claim 10, wherein the one or more processors are implemented by one or more central processing units having multiple cores and implementing single instruction, multiple data (SIMD) processing and the one or more central processing units implement the first processing block and the second processing block.

24. The system of claim 18, wherein the one or more processors comprise one or more central processing units having multiple cores and implementing single instruction, multiple data (SIMD) processing.

* * * * *